Jan. 10, 1956

CARL-GUSTAF HÅRD AF SEGERSTAD ET AL   2,729,968

PNEUMATIC GAGING DEVICE

Filed April 28, 1953

Inventors:
Carl-Gustaf Hård af Segerstad,
Åke Henrik Malmquist,
by Pierce, Scheffler + Parker,
Attorneys.

United States Patent Office 2,729,968
Patented Jan. 10, 1956

2,729,968

PNEUMATIC GAGING DEVICE

Carl-Gustaf Hard af Segerstad and Ake H. Malmquist, Sandviken, Sweden, assignors to Sandvikens Jernverks Aktiebolag, Sandviken, Sweden Application April 28, 1953, Serial No. 351,558

1 Claim. (Cl. 73—37.6)

This invention relates to measuring apparatus for checking the dimensions of a work piece and more particularly to measuring apparatus including at least two pressure responsive devices responsive in different manners to departures of the selected dimension from a preselected ideal or nominal value.

If the thickness of a linear work piece is measured at short intervals, or the radius of a nominally circular work piece is measured at various points around the circumference, an error curve can be plotted which can be broken down or analyzed as the sum of a plurality of sine or cosine curves of different frequencies. The lowest possible frequency of a component curve is zero, which corresponds to a constant deviation, plus or minus, from the desired nominal value. In general, a work piece is not uniformly oversize or undersize and the error curve will include components of finite frequencies which add to or subtract from the constant or zero frequency error at different points along the work piece. The zero frequency error represents the mean or average error in the measured dimension, and the difference of the maximum and minimum peaks of the higher frequency component curve is equal to the maximum variation in the measured dimension.

Milled products which have gone through several stages of manufacture usually exhibit small errors of different frequencies which are characteristic of the manufacturing steps. The prior practice in the checking of such work pieces has been for the operator to move the work piece slowly with respect to a gauge to locate and measure the maximum and minimum dimensions, and to subtract the measured values. The piece is approved if it meets two requirements, i. e. that the maximum and minimum dimensions do not exceed certain prescribed tolerances, and that the total variation in dimension does not exceed another prescribed value. This control process, which frequently must be performed with considerable precision, is both laborious and time consuming.

Objects of the present invention are to provide measuring apparatus for the more convenient and more rapid checking of a dimension of a work piece with respect to a preselected nominal value. An object is to provide measuring apparatus including at least two pressure responsive devices responsive respectively to dimensional errors along or around a work piece and to substantially the mean or average dimensional error. More specifically, an object is to provide a measuring apparatus for the checking of work pieces of nominally circular cross-section, and in which the work piece is rotated adjacent a pneumatic nozzle connected to a pressure source and a pair of pressure-responsive devices, one pressure responsive device being subject to substantially the instantaneous pressure at the nozzle and the other being subject to the average pressure at the nozzle.

These and other objects and advantages of the invention will be apparent from the following specification when taken with the accompanying drawing in which.

Figure 1:
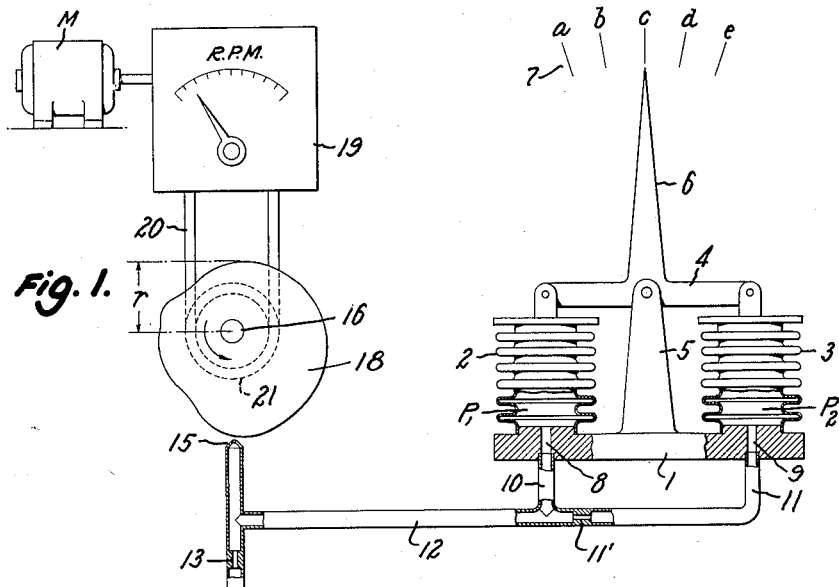
Fig. 1 is a schematic view of measuring apparatus embodying the invention as applied to the checking of the dimensional variation in the radius of a nominally circular work piece.

In Fig. 1 of the drawing, the reference numeral 1 identifies a common base or foundation to which the lower ends of two pressure-responsive expansible chambers or bellows 2 and 3 are fastened. The opposite ends of a lever 4 are pivotally connected to the upper ends of the bellows 2, 3 and the lever is journalled at substantially its center point on a standard 5 which is fixed to or integral with the base 1. A pointer 6 is fixed to the lever for cooperation with a scale 7 which is supported in any suitable manner from the base.

The interiors of the bellows 2, 3 have inlet ports 8, 9 respectively in the base 1 which are connected through individual branch pipes 10, 11 respectively to a common conduit 12. The pipe 10 has an unobstructed opening into conduit 12, but the pipe 11 which leads to the bellows 3 is provided with a throttling device 11'. The conduit 12 is connected through a throttling section 13 to a source 14 of pressure air, and it extends also to a so-called "free blowing" sensing mechanism 15, i. e. a nozzle at which the escape opening is throttled more or less by the object to be measured. In the case of a circular work piece, the nozzle is positioned adjacent a rotatable shaft 16 on which the work piece 18, for example a ball bearing ring, may be fixed. The errors in the radius $r$ of the ring are greatly exaggerated in the drawing. The shaft 16 may be driven at a desired and adjustable speed by any suitable means, for example from a motor M through a variable speed transmission 19, belt 20 and pulley 21.

Figure 2:
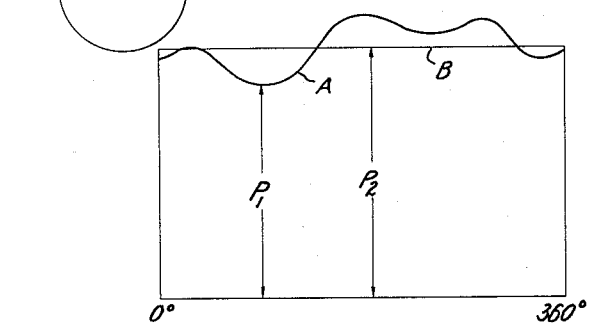
Fig. 2 is a curve sheet showing the pressures established in the measuring chambers on cyclic rotation of the work piece adjacent the feeler nozzle.

The measuring apparatus is placed in operation to check the radius of a work piece 18 by placing the shaft 16 in rotation, whereby the varying radius $r$ gives rise to a varying degree of throttling of the nozzle 15, and this results in a varying pressure in conduit 12 which is freely transmitted to the bellows 2 but damped in transmission to the bellows 3 in view of the throttling member 11'. The pressure $P_1$ in bellows 2 will therefore vary with the radius of the work piece, for example according to curve A of Fig. 2, as the work piece is rotated, but the pressure $P_2$ in bellows 3 will be substantially constant at some relatively low rotary speed, as shown by curve B, at the time averaged value of the pressure $P_1$.

Without recording any data for the plotting of an error curve A, the operator quickly obtains an indication of the pressure $P_2$ from the region of fluctuation of the pointer 6 along the scale 7, and this is a measure of mean value of the zero and low frequency components of the error curve and thus indicative of the oversize or undersize character of the work piece. The range of fluctuation of the pointer 6 along the graduations of the scale 7 is indicative of the magnitude of the higher frequency components of the error curve, and thus of the variations of the radius of the work piece from the mean oversize or undersize value.

Figure 3:
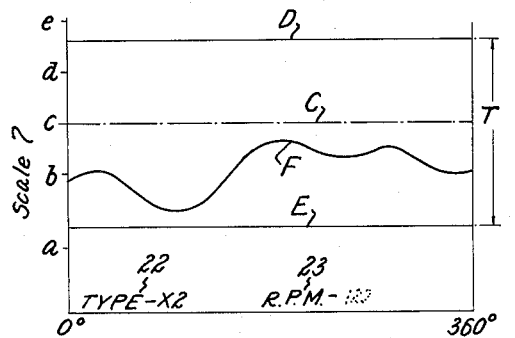
Fig. 3 is a tolerance chart for use in the checking of some particular type of work piece, the complete error curve for a specimen work piece being superposed upon the tolerance chart.

The tolerance range varies for different types of work pieces, for example with ball bearing rings of different sizes and for different uses, and it is convenient to prepare a tolerance chart, such as exemplified in Fig. 3, for each type of work piece. The chart carries a notation 22 of the type of work piece and a notation 23 of the speed at which the shaft 16 is to be rotated, a line C indicating the fixed reading of pointer 6 along scale 7 which would be obtained if the work piece were geometrically circular and of the nominal radius, and lines D and E marking the upper and lower limits of pointer position for a work piece whose varying radius falls within the tolerance limits of a predetermined range T. A work piece having an error curve F which, if plotted on the tolerance chart, would fall between the lines D and E is satisfactory, and the inspection of the work piece is therefore limited to an observation as to whether or not the pointer 6 swings beyond the scale graduations corresponding to lines D and E.

We claim:

In measuring apparatus for checking the departure of a dimension of a work piece from a preselected nominal value comprising a sensing mechansim for developing a quantity which varies in magnitude with the departure of the dimension of the work piece from the preselected nominal value, means for supporting a work piece and cyclically displacing the same with respect to said sensing mechanism, said sensing mechanism comprising a nozzle, a source of compressed air connected to said nozzle through a conduit including a throttling section, a first expansible chamber pressure-responsive means responsive to substantially the instantaneous value of said developed quantity, a second expansible chamber pressure-responsive means responsive to substantially the mean value of said developed quantity, the connection of the first pressure responsive means to said conduit being unobstructed and the connection to the second pressure responsive means including a throttling element, and indicating means actuated jointly by said first and second pressure responsive means to indicate the maximum and minimum departures of the work piece dimension from the preselected nominal value.

References Cited in the file of this patent

UNITED STATES PATENTS

| | | |
|---|---|---|
| 2,005,773 | De Florez | June 25, 1935 |
| 2,478,391 | Segerstad | Aug. 9, 1949 |
| 2,512,561 | Ziegler | June 20, 1950 |
| 2,560,883 | Mennesson | July 17, 1951 |
| 2,589,251 | Heinz | Mar. 18, 1952 |